E. MEITNER.
CORRECTION MECHANISM FOR INTEGRATING DEVICES.
APPLICATION FILED MAR. 15, 1918.
1,415,601. Patented May 9, 1922.
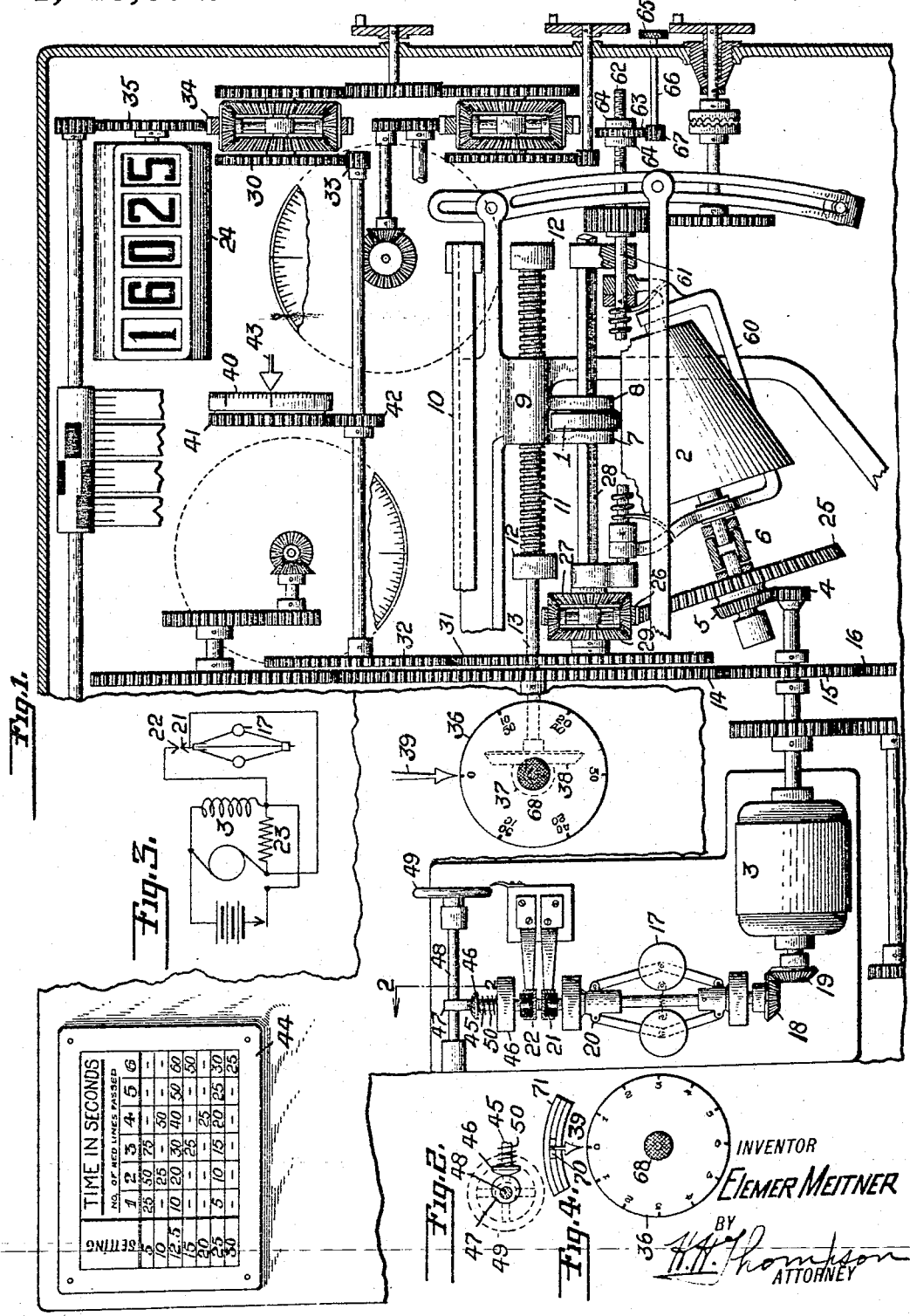

UNITED STATES PATENT OFFICE.

ELEMER MEITNER, OF BROOKLYN, NEW YORK, ASSIGNOR TO THE SPERRY GYROSCOPE COMPANY, OF BROOKLYN, NEW YORK, A CORPORATION OF NEW YORK.

CORRECTION MECHANISM FOR INTEGRATING DEVICES.

1,415,601.  Specification of Letters Patent.  Patented May 9, 1922.

Application filed March 15, 1918. Serial No. 222,613.

*To all whom it may concern:*

Be it known that I, ELEMER MEITNER, a subject of the King of Hungary, residing at 87 Columbia Heights, Brooklyn, in the county of Kings and State of New York, have invented certain new and useful Improvements in Correction Mechanism for Integrating Devices, of which the following is a specification.

This invention relates to indicating instruments of the integrating type, more specifically to that class of such instruments in which frictionally engaging speed changing elements are employed.

In devices of the above mentioned class it is common to employ a driving member rotated at a substantially constant speed and to mount a driven member in frictional engagement therewith, at least one of said members being in the form of a disk, cone, sphere or other suitable shape. By changing the relative positions of said driving and driven members in accordance with the rate of change of some function it is possible, in theory, to cause the extent of rotation of the driven member to be proportional to the integral of said function with respect to time. In practice, however, it is found that the accuracy of such apparatus is greatly disturbed due to changes in temperature, humidity and other factors.

The principal object of the present invention is to provide indicating means for determining at all times whether or not the actual speed of the driven member is what it should be, i. e., equal to the predetermined calculated speed, and further to provide means for causing the actual speed to correspond to the calculated speed. Other objects and advantages will appear as the invention is hereinafter disclosed.

Referring to the drawings which illustrate what I now consider the preferred form of my invention:

Fig. 1 is a fragmentary plan view, partly in section, of my invention applied to a range clock.

Fig. 2 is a detail section taken on the line 2—2 of Fig. 1.

Fig. 3 is a wiring diagram.

Fig. 4 is a detail of a slightly modified form of indicator.

While my invention is applicable to various forms of indicating instruments utilizing different forms of speed changing elements, I have, for the sake of simplicity and convenience illustrated it in connection with the range clock disclosed in my companion application, Serial No. 40,235, filed July 16, 1915. In some respects the present application may be said to be a continuation of said companion application.

As set forth in the said companion application, the range clock comprises friction roller 1, adapted to engage frictionally a speed cone 2, which speed cone is driven at a substantially constant speed by means of gears 4, 5, and a flexible coupling 6. The roller 1 is adapted to be placed in various positions along said cone in accordance with a certain function, more specifically, in accordance with the rate of change of range. This change in position of said roller is accomplished by mounting it between the arms 7 and 8 of nut 9 slidably mounted in a guide 10. The screw 11 engages said nut 9 and is rotatably, but non-slidably, mounted in brackets 12. The shaft 13 of the screw 12 is connected by means of gears 14, 15 and 16 to a mechanism not shown, positioned in accordance with the rate of change of range or bearing of a target.

The motor 3 may be maintained at a substantially constant speed by any suitable means such as that illustrated in Figs. 1 and 3. The governor 17 is connected to the shaft of said motor by suitable gears 18 and 19 and the slidable element 20 of said governor is connected to an electrical contact 21 to cause movement of the latter in an axial direction in accordance with the speed of the motor 3. The contact 21 is adapted to cooperate with a relatively fixed contact 22. While the said contacts may be connected to the motor 3, in various ways for controlling the speed of the latter, I prefer at present to employ the form of electrical connections illustrated in Fig. 3. The motor 3 is shown as shunt-wound and as having the resistance 23 connected in series with the armature thereof. The contacts 21 and 22 are shunted across said resistance 23 so that when the speed of said motor rises above its predetermined value said contacts will open thus breaking the short circuit across the resistance 23 and reducing the motor speed. If on the other hand the speed of said motor drops below the predetermined value, contacts 21 and 22 close to shunt out the resistance 23 and thus cause the motor speed to increase.

From the above description it will be apparent that the speed of the motor 3 will be maintained at a substantially constant value depending on the position of the relatively fixed contact 22. The roller 1 is adapted to actuate an indicator 24 adapted to indicate the range and while various forms of connections may be utilized to accomplish this function I prefer to use the connections illustrated in both the prior and present application. The shaft of gear 5 has rigidly connected thereto the gear 25 which meshes with the arm 26 of a differential train. Another arm 27 of said train is mounted on a squared shaft 28 on which the roller 1 is slidably but non-rotatably mounted. The third arm 29 of said differential train is shown connected to one arm 30 of a second differential train through gears 31, 32 and 33. Another arm 34 of said last named differential is connected to the range indicator 24 by means of the gear wheel 35. The design of the parts is preferably such that when the roller 1 is in a substantially central position with respect to cone 2 the arm 29 will be stationary.

While not shown in Fig. 1, which is a plan view, it is obvious that screw member 11 should engage nut member 9 at a point sufficiently below the lateral plane of shaft 28 to permit shaft 13 to pass freely under gear 31.

I have found by experiment that the accuracy of the instrument may be greatly increased by constructing the roller 1 of bone or ivory and the cone 2 of brass, as this combination seems to be least affected by changes in temperature and humidity. However, even with the substances above specified I find that the actual speed of the roller 1 will vary in a somewhat erratic fashion from day to day from its calculated speed due to atmospheric and other changes. In order to correct these differences the means illustrated, and constructed substantially as follows, may be employed.

The shaft 13 is shown connected to a dial 36 by means of gears 37 and 38. An arrow or other reference device 39 may be provided for said dial and the latter may be calibrated to indicate the relative position of the parts 1 and 2; or more specifically, the position of part 1. For any specific reading on dial 36, that is, for any specific position of the roller 1 with respect to cone 2, the arm 29 should have a definite speed which should not vary from day to day. The indicator 24 may be employed in conjunction with a chronometer or other timing means for determining the actual speed of the arm 29 at any time. Instead of employing the indicator 24 for this purpose I prefer to provide a separate indicator 40 carried by a gear wheel 41 which meshes with gear 42 on the shaft of gear 32. A pointer or other reference member 43 may be mounted adjacent to said indicator 40 and the speed of the arm 29 may be measured or determined by counting the number of graduations of the indicator 40 which pass the pointer 43 in a predetermined time. The dial 36 may be graduated in even scale divisions on either side of its central or zero position and a table 44 may be provided for convenience in determining the number of scale divisions which should pass the pointer 43 in a predetermined time for the corresponding position of member 1 with respect to member 2. Thus if the reading of dial 36 is 5 the number of reference lines on indicator 40, which may be colored in red for convenience, passing pointer 43 in fifty seconds should be 2. By reading the indicators 36 and 40 in conjunction with the table 44 it is possible to determine whether the actual speed of the arm 29 is equal to or different from the predetermined calculated speed. Any difference in calculated and actual speed may be corrected by changing the speed of the arm 29 in any suitable manner.

A convenient method of accomplishing the last mentioned function is by adjusting the contact 22 with reference to the contact 21, thus changing the speed of the motor 3, cone 2, roller 1 and consequently arm 29. The contact 22 is shown mounted on a rod 45 slidable in a bracket 46 and provided at the end opposite the contact 22 with a head 46. The last named element is adapted to be engaged by a cam 47 carried by a shaft 48 which may be rotated by hand wheel 49. A spring 50 may be provided on said rod 45 between the head of the latter and the bracket 46 in order to bias said rod to cam engaging position. Obviously the member 49 provides a ready means for causing the actual speed as indicated at 40 to equal the calculated speed determined from the table or chart 44 employed in conjunction with the reading of dial 36.

The table 44 may be entirely dispensed with by properly calibrating the dial 36. Thus said dial may be calibrated to indicate the number of red or other lines on indicator 40 which should pass the pointer 43 in a given time. In Fig. 4 I have shown the dial 36 so calibrated as to indicate the number of red lines of the indicator 40 which should pass the pointer 43 in 25 seconds. Obviously the dial 36 may also be so calibrated as to indicate the time in which a predetermined number of red lines should pass pointer 40 but to avoid multiplicity of views this arrangement has not been illustrated.

As previously stated when the roller 1 is in a substantially central position with respect to roller or cone 2 the arm 29 and consequently indicators 40 and 24 should be stationary although the rollers are actuated. This is theoretically true regardless of what the speed of motor 3 and cone 2 may happen to be. Practically, however, the above mentioned position of the roller 1, which I will term the zero position, varies from day to day due to atmospheric and other changes. To state this in another way, the dial 36, should read zero when the member 29, and consequently member 40, is stationary regardless of what the speed of the cone 2 may happen to be. If it is found that the dial 40 is rotating when said dial 36 indicates zero an adjustment is necessary. This adjustment may be accomplished in various ways, one method being by shifting one of the friction rollers with respect to the other. Thus the frame 60 of roller 2 may be shifted longitudinally, with respect to roller 1, by shifting the shaft 61, to which said frame is secured. The shaft 61 is shown threaded at 62 and provided with a nut 63, provided with gear teeth at its periphery. The nut 63 may be prevented from moving axially by brackets 64 and may be rotated by turning a milled head 65 on a shaft 66 which is provided with a pinion 67 meshing with the teeth of nut 63. The procedure to adjust the parts for zero position may be substantially as follows.

The motor 3 should be started and the dial 36 adjusted to zero position by turning the nut 68 on the shaft of gear 37. The indicator 40 should then be stationary. If the latter is moving the member 65 should be turned in the proper direction until the indicator 40 becomes stationary.

The adjustment of the parts to zero position may be accomplished in various other ways. For example the roller 1 may be manually adjusted, by means of the nut 68, until the indicator 40 is stationary, while motor 3 is running. The indicator 36 should then read zero and the setting of dial 36 to zero position, with respect to the pointer 39, should be accomplished without disturbing the relative position of the rollers. While the last mentioned function might be accomplished by making the dial 36 adjustable with respect to gear 37 a somewhat simpler means for accomplishing said function is shown in Fig. 4. In the last mentioned figure the pointer or index 39 is shown connected to a block 70 slidably mounted in an arcuate guide 71. With this form of adjustment the nut 68 is adjusted to cause the indicator 40 to be stationary. The pointer 39 is then adjusted to a position coinciding with the position of the zero on dial 36.

Preferably the zero adjustment of the rollers should be made before the instrument is put into service each day. The adjustment of the speed of the motor 3, however, may be, and preferably should be, made while the instrument is operating.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted and some of the features of each modification may be embodied in the others without interfering with the more general results outlined, and the invention extends to such use.

Having described my invention, what I claim and desire to secure by Letters Patent is:

1. In combination, a driving member, a driven member actuated by said driving member at a speed depending upon the relative position of said members, indicating means actuated by said driven member, means comprising a part actuated in accordance with the relative position of said members for determining what the reading of said first mentioned indicating means should be and means for adjusting the speed of at least one of said members.

2. In combination, a rotatable driving member, a rotatable driven member frictionally engaging said driving member, means for varying the ratio of angular velocities of said members, an indicating element operatively connected to said means, indicating mechanism operated by said driven member, means comprising said indicating element for indicating what the speed of said indicating mechanism should be and means for varying the speed of said driven member.

3. An instrument for integrating the rate of change of a function comprising in combination, a pair of frictionally engaging rollers, means for driving one of said rollers at a substantially constant speed, means for positioning one of said rollers in accordance with the rate of change of said function, an indicator connected to at least one of said rollers to be operated by rotation thereof, an indicator positioned in accordance with the position of one of said rollers with respect to the other and means for adjusting the speed of one of said rollers to cause the reading of the first named indicator to correspond to that of the second named indicator.

4. In combination, a pair of frictionally engaging rollers, means for varying the ratio of the effective radii of said rollers, an indicator operatively connected to said means, an indicator operatively connected to at least one of said rollers, to be actuated on revolution thereof and means for adjusting the speed of revolution of one of said rollers to cause the readings of said indicators to correspond.

5. In combination, a driving roller, a driven roller, means for changing the ratio of angular velocities of said rollers in accordance with the rate of change of a function, means including said rollers for mechanically integrating said rate of change, means including a plurality of indicators for determining errors in the integration and means for adjusting the speed of said driven member for correcting such errors.

6. An integrating mechanism comprising a rotatable driving member, a rotatable, driven member in frictional engagement with said driving member, indicating means positioned in accordance with the rotation of said members and means for varying the drive ratio between said members, one of said members being constructed of metal and the other of said members of bone.

7. An integrating instrument comprising an ivory roller, a brass roller in frictional engagement with said ivory roller, one of said rollers being substantially cone shaped, means for rotating one of said rollers, means for moving one of said rollers in a direction parallel to the axis of one of said rollers and indicating means positioned in accordance with the rotation of said rollers.

8. In combination, a driving roller, a driven roller actuated thereby, means for changing the relative position of said rollers to vary the ratio of speed thereof, a member differentially connected to said rollers and driven thereby at a speed ranging from a positive to a negative value depending on the relative position of said rollers, means for indicating the relative positions of said rollers at which the speed of said member should be zero, means for indicating when the speed of said member is zero and means for effecting an adjustment to cause the readings of said indicating means to correspond when the actual speed of said member is zero.

9. In combination, a driving roller, a driven roller actuated thereby, means for changing the relative position of said rollers to vary the ratio of speeds thereof, a member differentially connected to said rollers and driven thereby at a speed ranging from a positive to a negative value depending on the relative position of said rollers, means for indicating the relative position of said rollers at which the speed of said member should be zero, means for indicating when the speed of said member is zero, means for effecting an adjustment to cause the readings of said indicating means to correspond when the actual speed of said member is zero and means for varying the speed of said driving member.

10. In combination, a pair of frictionally engaging rollers, the engaging surface of one of said rollers being of ivory and that of the other of brass, means for varying the ratio of the effective radii of said rollers, an indicator operatively connected to said means, an indicator operatively connected to at least one of said rollers, to be actuated on revolution thereof, and means for adjusting the speed of revolution of one of said rollers to cause the readings of said indicators to correspond.

11. In combination, a pair of frictionally engaging rollers, means for varying the ratio of the effective radii of said rollers, an indicator positioned in accordance with the relative speeds of rotation of said rollers, an indicator positioned in accordance with the position of one of said rollers, and means for changing the relative readings of said indicators without changing said relative speeds or the position of said last mentioned roller.

In testimony whereof I have affixed my signature.

ELEMER MEITNER.